United States Patent
Boyle et al.

(10) Patent No.: US 7,907,364 B2
(45) Date of Patent: Mar. 15, 2011

(54) DISK DRIVE INCLUDING A DELAY CIRCUIT TO PROVIDE A DELAYED RESET SIGNAL

(75) Inventors: William B. Boyle, Lake Forest, CA (US); Robert P. Ryan, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 183 days.

(21) Appl. No.: 12/201,571

(22) Filed: Aug. 29, 2008

(65) Prior Publication Data

US 2010/0053796 A1    Mar. 4, 2010

(51) Int. Cl.
*G11B 19/04* (2006.01)
*G11B 15/08* (2006.01)
*G11B 21/02* (2006.01)

(52) U.S. Cl. ................... 360/60; 360/69; 360/75
(58) Field of Classification Search .......... 360/60, 360/69, 75
See application file for complete search history.

(56) References Cited

U.S. PATENT DOCUMENTS

| | | | |
|---|---|---|---|
| 4,375,663 A | 3/1983 | Arcara et al. | |
| 4,516,214 A | 5/1985 | Ray | |
| 5,198,942 A | 3/1993 | Iizuka et al. | |
| 5,414,861 A | 5/1995 | Horning | |
| 5,872,670 A | 2/1999 | Ataee | |
| 5,889,629 A | 3/1999 | Patton, III | |
| 6,115,200 A | 9/2000 | Allen et al. | |
| 6,292,322 B1 | 9/2001 | Haraguchi | |
| 6,476,996 B1 | 11/2002 | Ryan | |
| 6,566,832 B2 | 5/2003 | Ataee | |
| 6,574,062 B1 | 6/2003 | Bennett et al. | |
| 6,594,102 B1 | 7/2003 | Kanda et al. | |
| 6,714,371 B1 | 3/2004 | Codilian | |
| 6,725,397 B1 | 4/2004 | Emberty et al. | |
| 6,798,599 B2 | 9/2004 | Dykes et al. | |
| 7,075,745 B2 | 7/2006 | Kaneko et al. | |
| 7,126,857 B2 | 10/2006 | Hajeck | |
| 7,161,757 B1 | 1/2007 | Krishnamoorthy et al. | |
| 7,206,158 B2 * | 4/2007 | Kusumoto | 360/75 |
| 7,227,803 B2 * | 6/2007 | Lee et al. | 365/228 |
| 7,430,089 B2 * | 9/2008 | Suzuki et al. | 360/75 |

FOREIGN PATENT DOCUMENTS

JP    2003330627 A  * 11/2003

OTHER PUBLICATIONS

"High-Integrity Storage of Linked Lists on Disk without Logging", Jun. 1, 2994, IBM Technical Disclosure, vol. 37, pp. 43-44.*

* cited by examiner

*Primary Examiner* — Daniell L Negrón
*Assistant Examiner* — Regina N Holder

(57) ABSTRACT

A disk drive including a delay circuit to provide a delayed reset signal is disclosed. The disk drive includes a head to perform write and read operations to and from a disk and a disk controller that is coupled to the head to control the write and read operations performed by the head. The disk drive further includes: a power loss detection circuit to detect a power loss and to generate a reset signal in response to the power loss; a reset power line coupled to the disk controller and the power loss detection circuit to provide a non-delayed reset signal to the disk controller; and a delay circuit coupled to the reset power line wherein the delay circuit delays the reset signal to provide a delayed reset signal.

25 Claims, 7 Drawing Sheets

DISK DRIVE INCLUDING A DELAY CIRCUIT TO PROVIDE A DELAYED RESET SIGNAL

BACKGROUND OF THE INVENTION

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a spindle motor for rapidly rotating the disk, and a head stack assembly ("HSA") that includes a head gimbal assembly (HGA) with a moveable transducer head for reading and writing data. The HSA forms part of a servo control system that positions the moveable transducer head over a particular track on the disk to read or write information from and to that track, respectively.

Typically, a conventional hard disk drive includes a disk having a plurality of concentric tracks. Each surface of each disk conventionally contains a plurality of concentric data tracks angularly divided into a plurality of data sectors. In addition, special servo information may be provided on each disk to determine the position of the moveable transducer head.

The most popular form of servo is called "embedded servo" wherein the servo information is written in a plurality of servo sectors that are angularly spaced from one another and are interspersed between data sectors around each track of each disk.

A significant problem that can occur in hard disk drives relates to data loss that may be caused by interruptions in the power signal supplied by the host computer. For example, a power loss may occur that causes a write data sector operation to terminate prematurely resulting in commanded write data to not actually be written to the data sector of the disk.

Hard disk controllers typically have an abort mechanism that causes currently active write operations to the disk to halt upon the detection of a reset signal due to a loss of power from the host computer. In the abort mechanism, the write-gate signal is removed immediately and additional data that was commanded to be written to the data sector is not written causing a "write-splice" on the disk at the point where the write-gate was removed. The write-splice causes any subsequent read operations of the data sector with the write-splice to return an uncorrectable error correction code (ECC) error back to the host computer.

Thus, data may be permanently lost and ECC errors may occur. Further, this may result in the destruction of some types of software applications. In some instances, where a write-splice occurs in portions of the disk that relate to the operating system, the host computer may become unbootable and unusable.

There is therefore a need for a disk drive that addresses these limitations by eliminating the possibility of a write-splice occurring on the disk due to a power loss.

DETAILED DESCRIPTION

In the following description, various embodiments of the invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known electrical structures, circuits, methods, procedures, and components are not described in detail, or are shown in block diagram form, in order not to obscure the present invention. Furthermore, the present invention will be described in particular embodiments but may be implemented in other types of hardware, software, firmware, etc., or combinations thereof.

Figure 1:
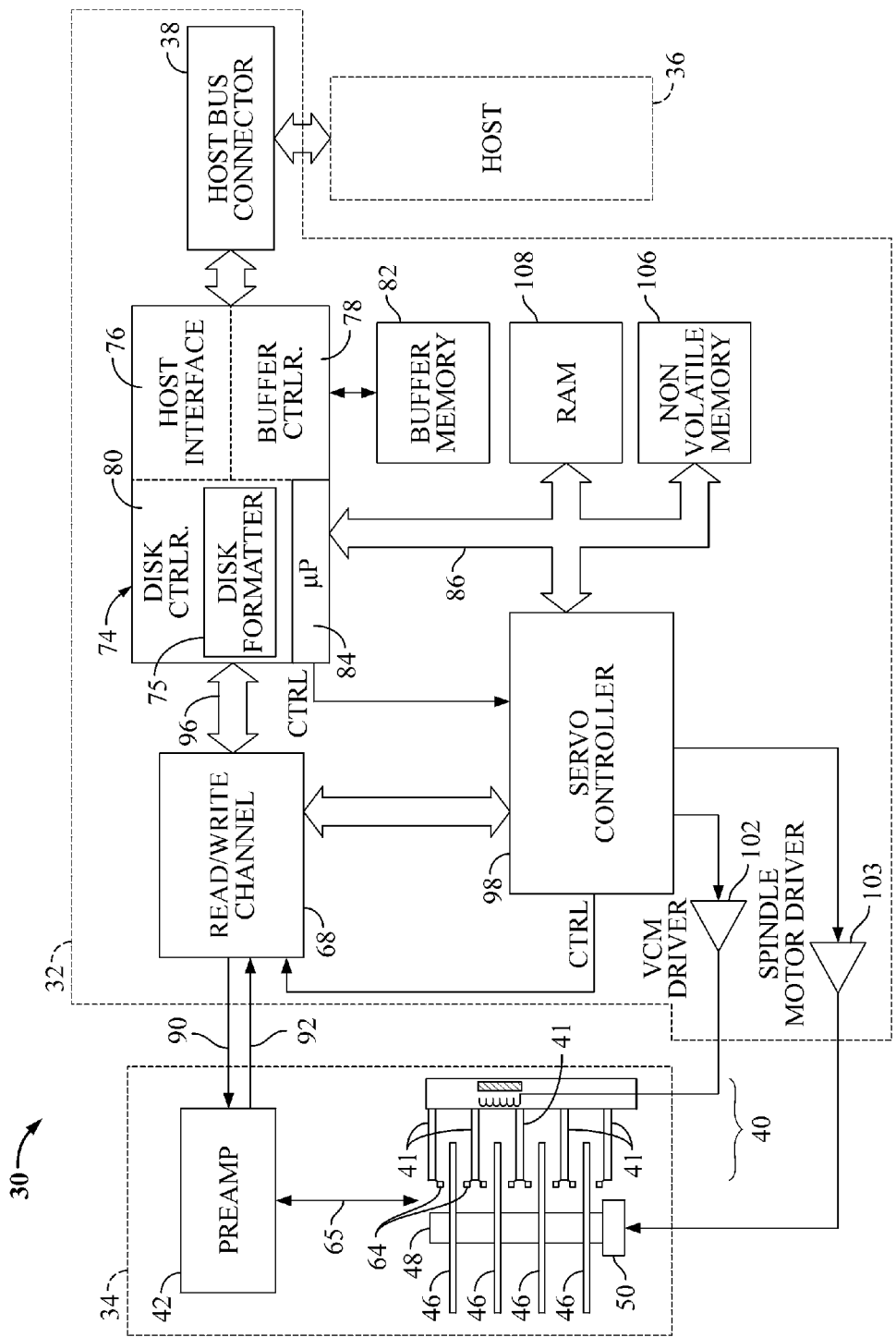
FIG. 1 shows a simplified block diagram of a disk drive in which embodiments of the invention may be practiced.

FIG. 1 shows a simplified block diagram of a disk drive 30, in which embodiments of the invention may be practiced. Disk drive 30 comprises a Head/Disk Assembly (HDA) 34 and a controller printed circuit board assembly (PCBA) 32. Host 36 may be a computing device such as a desktop computer, a laptop computer, a server computer, a mobile computing device (e.g. PDA, camera, cell-phone, etc.), or any type of computing device. Alternatively, host 36 may be a test computer that performs calibration and testing functions as part of the disk drive manufacturing process. Disk drive 30 may be of a suitable form factor and capacity for computers or for smaller mobile devices (e.g. a small form factor (SFF) disk drive).

HDA 34 comprises: one or more disks 46 for data storage; a spindle motor 50 for rapidly spinning each disk 46 (four shown) on a spindle 48; and an actuator assembly 40 for moving a plurality of heads 64 over each disk 46. Actuator assembly 40 includes a plurality of actuator arms 41 having heads 64 attached to distal ends thereof, respectively, such that the actuator arms 41 and heads 64 are rotated about a pivot point so that the heads sweep radially across the disks 46, respectively. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 may include a read/write channel 68, servo controller 98, host interface and disk controller (HIDC) 74, voice coil motor (VCM) driver 102, spindle motor driver (SMD) 103, microprocessor 84, and several memory arrays—buffer or cache memory 82, RAM 108, and non-volatile memory 106.

Host initiated operations for reading and writing data in disk drive 30 may be executed under control of microprocessor 84 connected to the controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as may be needed for execution.

During disk read and write operations, data transferred by preamplifier 42 may be encoded and decoded by read/write channel 68. During read operations, read/write channel 68 may decode data into digital bits transferred on an NRZ bus 96 to HIDC 74. During write operations, HIDC may provide digital data over the NRZ bus to read/write channel 68 which encodes the data prior to its transmittal to preamplifier 42. As one example, read/write channel 68 may employ PRML (partial response maximum likelihood) coding techniques, although other coding processes may also be utilized.

HIDC 74 may comprise a disk controller 80 including a disk formatter 75 for formatting disk data, providing error detection, and correcting of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

Servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103. For example, disk drive 30 may employ a sampled servo system in which equally spaced servo sectors are recorded on each track of each disk 46. Data sectors are recorded in the intervals between servo sectors on each track. Servo sectors are sampled at regular intervals by servo controller 98 to provide servo position information to microprocessor 84. Servo sectors are received by read/write channel 68, and are processed by servo controller 98 to provide position information to microprocessor 84 via bus 86.

Figure 2:
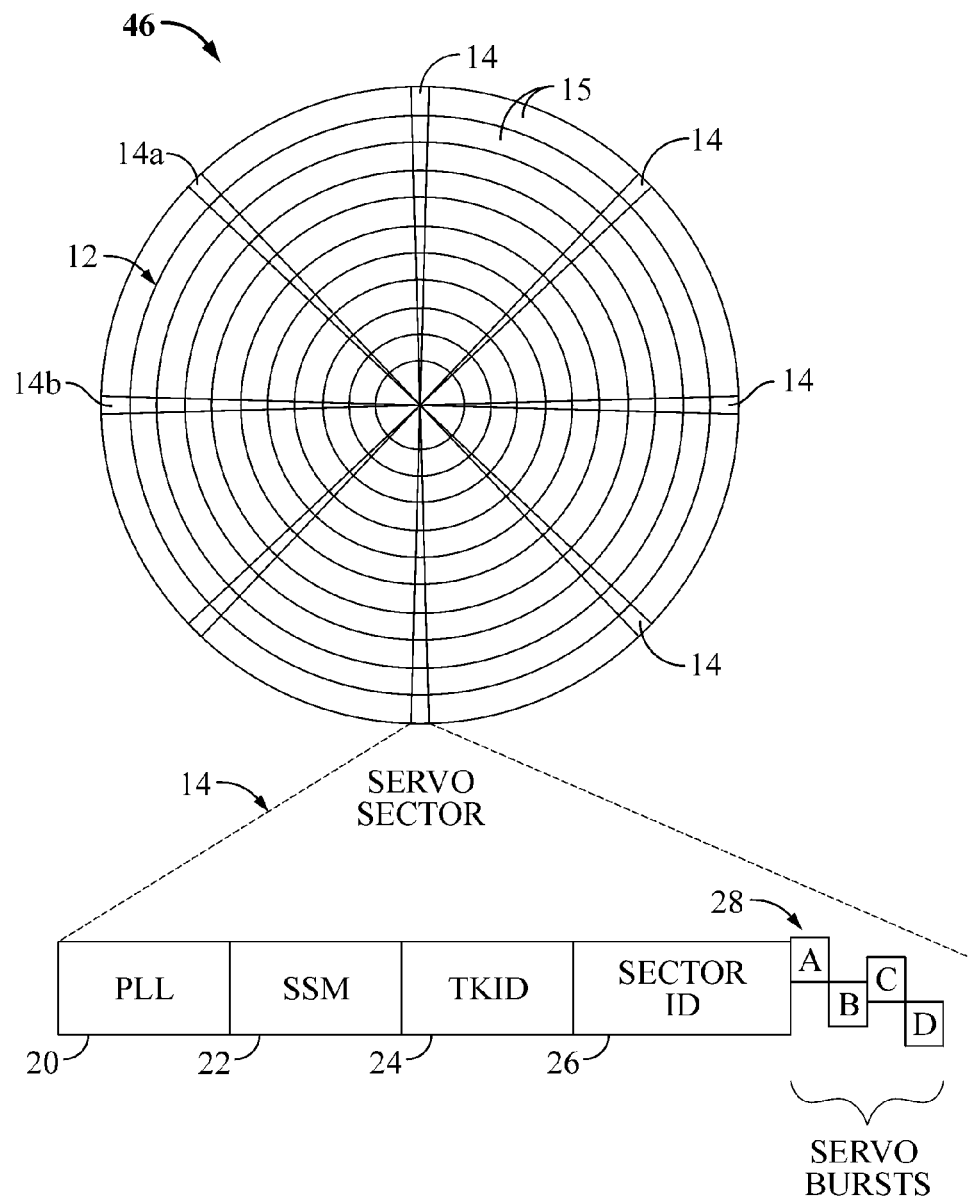
FIG. 2 is a diagram showing the disk of the disk drive having a plurality of concentric tracks, and more particularly, illustrates servo sectors and data regions, according to one embodiment of the invention.

FIG. 2 shows a disk 46 of disk drive 30 of FIG. 1 having a plurality of concentric tracks, and more particularly, illustrates a disk 46 that includes servo sectors 14 and data regions 15, according to one embodiment of the invention. The plurality of servo sectors 14 are servo-written circumferentially around disk 46 to define circumferential tracks 12 and are utilized in seeking and track following. In particular, embedded servo sectors 14a, 14b, etc., contain servo information utilized in seeking and track following and are interspersed between data regions 15 of the disk 46. Data is conventionally written in the data regions 15 in a plurality of discrete data sectors. Each data region 15 is typically preceded by a servo sector 14.

Each servo sector 14 may include: a phase lock loop (PLL) field 20, a servo sync mark (SSM) field 22, a track identification (TKID) field 24, a sector identifier (ID) field 26; and a group of servo bursts (e.g. ABCD) 28 (e.g. an alternating pattern of magnetic transitions) that the servo control system samples to align the moveable transducer head with, and relative to, a particular track. Typically, servo controller 98 moves the transducer head 64 toward a desired track during a "seek" mode using the TKID field 24 as a control input.

However, in processing information, it is necessary to ensure consistency in the detection of bits composing a block of bits. In order to ensure such consistency, the phase lock loop (PLL) field 20 is first read in order to facilitate bit synchronization. Next, the servo synch mark 22 is read to facilitate block synchronization. The SSM 22 facilitates block synchronization by acting as a special marker that is detected to "frame" data, i.e., to identify a boundary of a block. A valid servo synchronization signal results in the read/write channel 68 of the disk drive 30 establishing a precise timing reference point for the reading of servo data and for read/write operations. It is well known to provide framing of servo data via a SSM 22. The wedge ID 26 is a binary encoded wedge ID number to identify the wedge.

Once head 64 is generally over a desired track 12, servo controller 98 uses the servo bursts (e.g. ABCD) 28 to keep head 64 over the track in a "track follow" mode. During track following mode, head 64 repeatedly reads the sector ID 26 of each successive servo sector to obtain the binary encoded sector ID number that identifies each sector of the track. Based on the TKID and sector ID, servo controller 98 continuously knows where head 64 is relative to disk 46 and communicates this to microprocessor 84. In this way, the microprocessor 84 continuously knows where the head 64 is relative to the disk and can command the movement of the head 64, via the servo control system, to implement disk drive operations, suck as seeking, tracking, read/write operations, etc.

Figure 3:
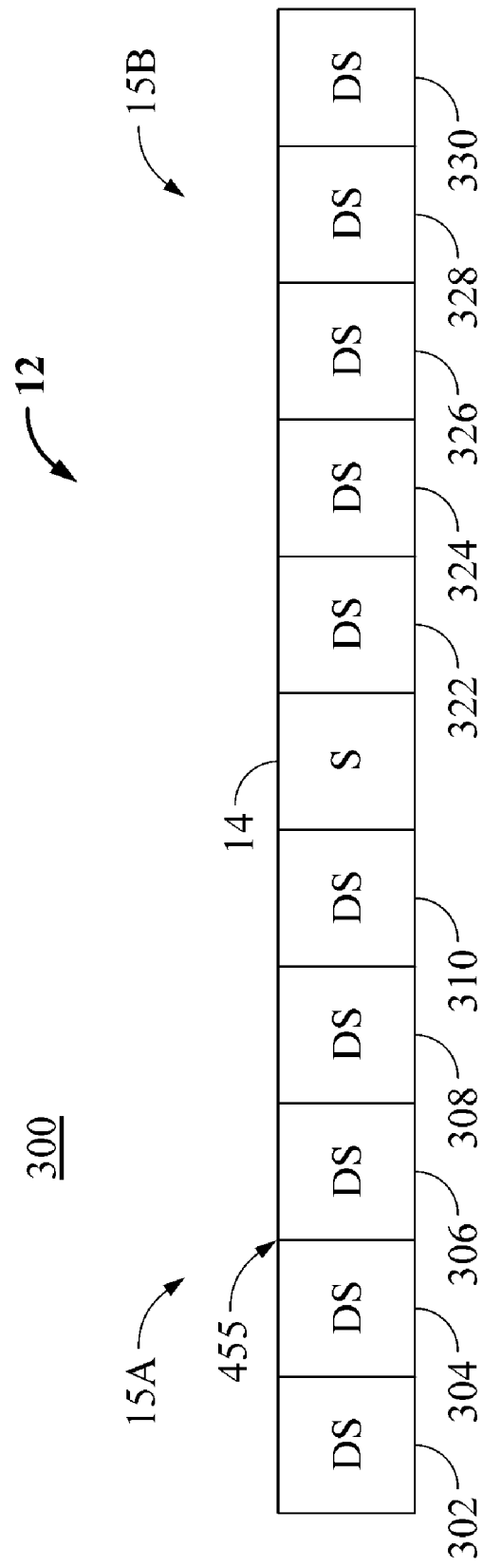
FIG. 3 shows a simplified diagram of a track, and more particularly, illustrates data sectors of data regions separated by a servo sector, according to one embodiment of the invention.

FIG. 3 shows a simplified diagram 300 of a track 12 from FIG. 2, and more particularly, illustrates data sectors of data regions 15 separated by a servo sector 14, according to one embodiment of the invention. In particular, each data region 15 includes multiple data sectors. For example, a first data region 15A includes multiple data sectors (DSs) 302, 304, 306, 308, and 310. A second data region 15B likewise includes multiple data sectors (DSs) 322, 324, 326, 328, and 330.

As can be seen in FIG. 3, the data sectors of first data region 15A and second data region 15B are separated by servo sector 14. In this example, each data region 15A and 15B includes five data sectors before being separated from subsequent data regions by a servo sector 14. However, it should be appreciated that dependent upon the type of disk and/or the radial location of the disk, any number of data sectors separated by servo sectors may be present dependent upon design considerations. Thus, FIG. 3 is only an example.

As will be described, in one embodiment, reset circuitry may be utilized in disk drive 30 to provide an early warning of an imminent power loss to allow an active write to stop at the end of the boundary of one of the data sectors (e.g., at the end of one of the data sectors DSs 302 . . . 330) such that a write-splice does not occur within the data sector itself. As previously described, a write-splice may result when data is only partially written to the data sector, which may cause subsequent read operations to return uncorrectable errors. Unfortunately, data may be permanently lost.

In one embodiment, a non-delayed reset signal is provided to disk formatter 75 to provide an early warning of an imminent power loss. Disk formatter 75 may then terminate any active write operations at the next data sector boundary and therefore avoid write-splices being written to the disk. For example, during the writing of DS 304 in FIG. 3, the active write operation will continue to the end of DS 304 (indicated by line 455) before DS 306 begins. At a later time, a delayed reset signal may be provided to disk formatter 75 to allow disk controller 80 to enter a normal reset condition while power is lost. A time setting value for the delayed reset signal may be set at a minimum value to allow disk formatter 75 to complete an active write operation for one DS or at a maximum value for the completion of multiple DSs while ensuring that the write operation is terminated before the actuator assembly 40 begins its motion to park head 64 due to the power loss.

Figure 4:
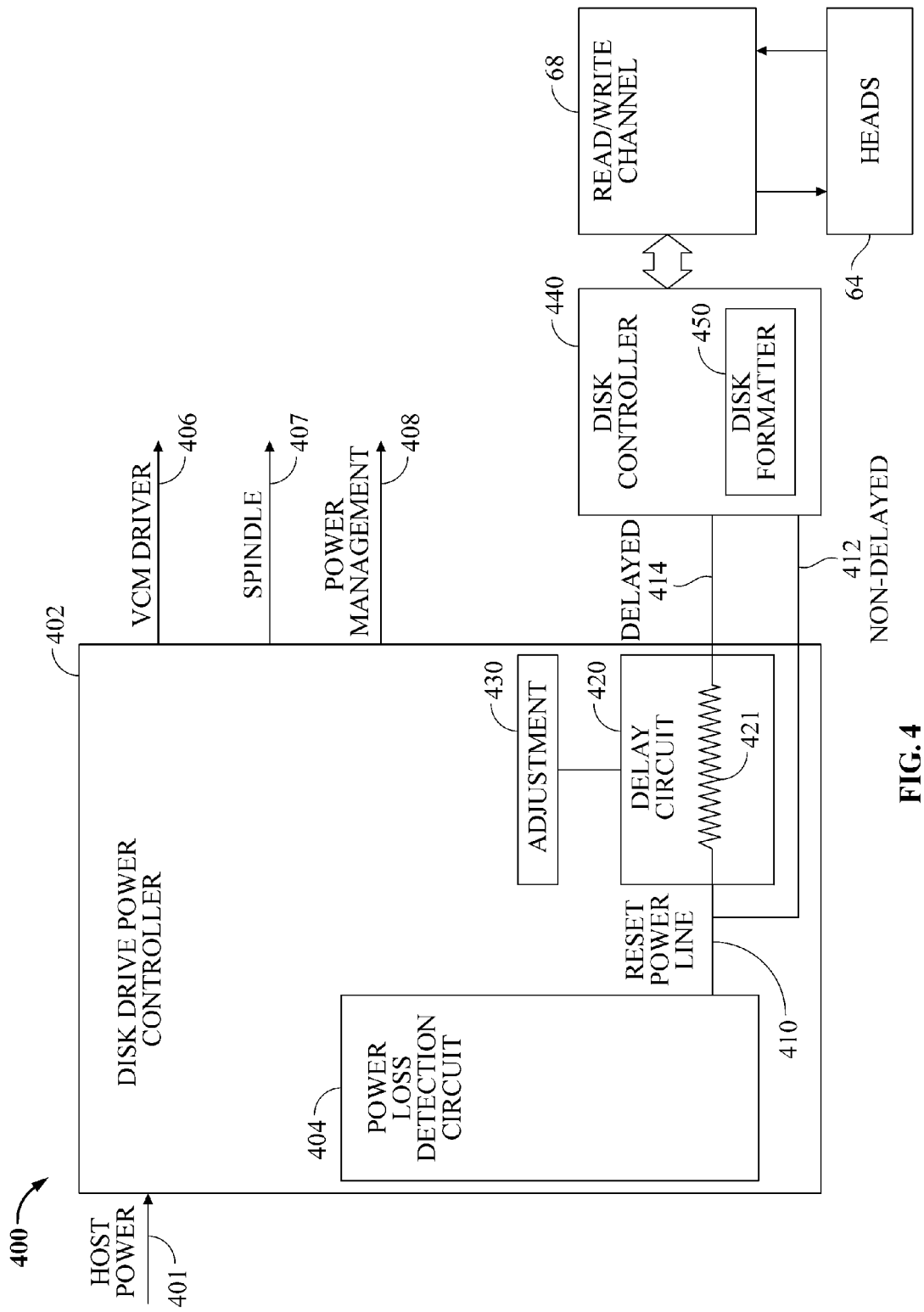
FIG. 4 is a block diagram of reset circuitry to generate both a non-delayed reset signal and a delayed reset signal, according to one embodiment of the invention.

FIG. 4 is a block diagram of reset circuitry 400 to generate both a non-delayed reset signal 412 and a delayed reset signal 414, according to one embodiment of the invention. Reset circuitry 400 includes a disk drive power controller 402 that receives host power 401 from a host computer. Disk drive power controller 402 provides power to various portions of disk drive 30 such as HDA 34 and PCBA 32. For example, disk drive power controller 402 provides VCM driver power 406, spindle motor driver power 407, as well as other power management 408, as is well known in the art.

Disk drive power controller 402 further includes a power loss detection circuit 404 that detects a power loss from the host power 401 and generates a reset signal along reset power line 410 in response to the power loss.

Reset power line 410 is coupled to delay circuit 420 and disk controller 440 which includes disk formatter 450. Further, disk controller 440 is coupled to read/write channel 68 and heads 64, as previously described. Delay circuit 420 may also be coupled to an adjustment circuit 430.

Reset power line 410 is coupled to disk controller 440 to provide a non-delayed reset signal 412. Further, delay circuit 420 delays the reset signal of reset power line 410 to provide a delayed reset signal 414 to disk controller 440.

Disk controller 440 responsive to the non-delayed reset signal 412 terminates an active write operation performed by a head 64 at a data sector boundary. In one particular embodiment, the data sector boundary may be at a next data sector boundary of the active write operation occurring after the non-delayed reset signal is received.

For example, referring back to FIG. 3, if DS 304 was being written, then the active write operation would continue after the non-delayed reset signal was received until DS 304 is completely written and the head reaches the next DS 306 at boundary 455. In this way, by terminating the active write operation performed by the head at the DS boundary, a write-splice is avoided in DS 304.

Disk controller 440 may then enter a reset condition and a controlled shutdown in response to the delayed reset signal 414 that is then received.

In one embodiment, delay circuit 420 may include a delay line 421. For example, delay circuit 420 may include a suitable long delay line 421 (as shown in FIG. 4) or may include a suitable hardware counter or RC counter. Additionally, in one embodiment, an adjustment circuit 430 may be coupled to the delay circuit 420 to provide a delay time to the delay circuit 420 to adjust the delay time of the delay circuit 420.

In one embodiment, delay circuit 420 may be set at a minimum delay value to allow disk controller 440 to finish an active write operation for one complete data sector, as previously described. Further, in one embodiment, delay circuit 420 may be constrained by a maximum delay value so that the write operation is terminated before the head 64 is moved back for parking due to the controlled shut-down for power loss implemented by the disk drive. For example, the adjustment circuit 430 may select a delay value based upon the maximum delay value, the minimum delay value, or the location of the head on the current data sector.

Numerous other types of reset circuitry will now be described in other embodiments of the invention. Various portions of previously described circuitry as set forth in FIG. 4 will not be repeated for brevity's sake.

Figure 5:
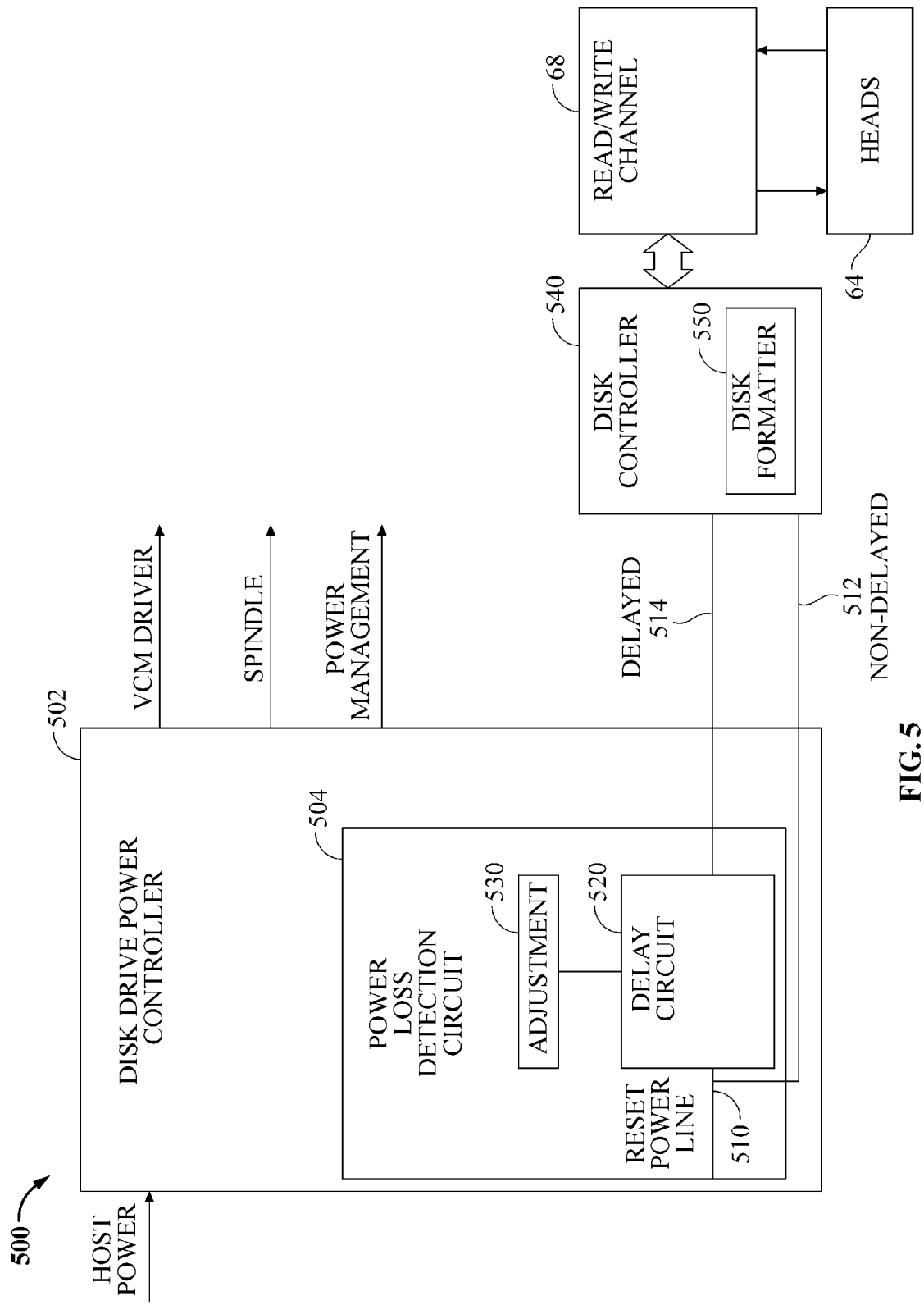
FIG. 5 is a block diagram of reset circuitry to generate both a non-delayed reset signal and a delayed reset signal, according to one embodiment of the invention.

For example, FIG. 5 is a block diagram of reset circuitry 500 to generate both a non-delayed reset signal 512 and a delayed reset signal 514, according to one embodiment of the invention. In this embodiment, power loss detection circuit 504 includes reset power line 510 coupled to delay circuit 520 and an adjustment circuit 530 coupled to delay circuit 520.

Power loss detection circuit 504 detects power loss from the host. Reset power line 510 is coupled to disk controller 540 and delay circuit 520. Power loss detection circuit 504 provides a non-delayed reset signal 512 along reset power line 510 to disk controller 540 and disk formatter 550. Further, delay circuit 520 is coupled to reset power line 510 and delays the reset signal to provide a delayed reset signal 514 to disk controller 540 and disk formatter 550.

Figure 6:
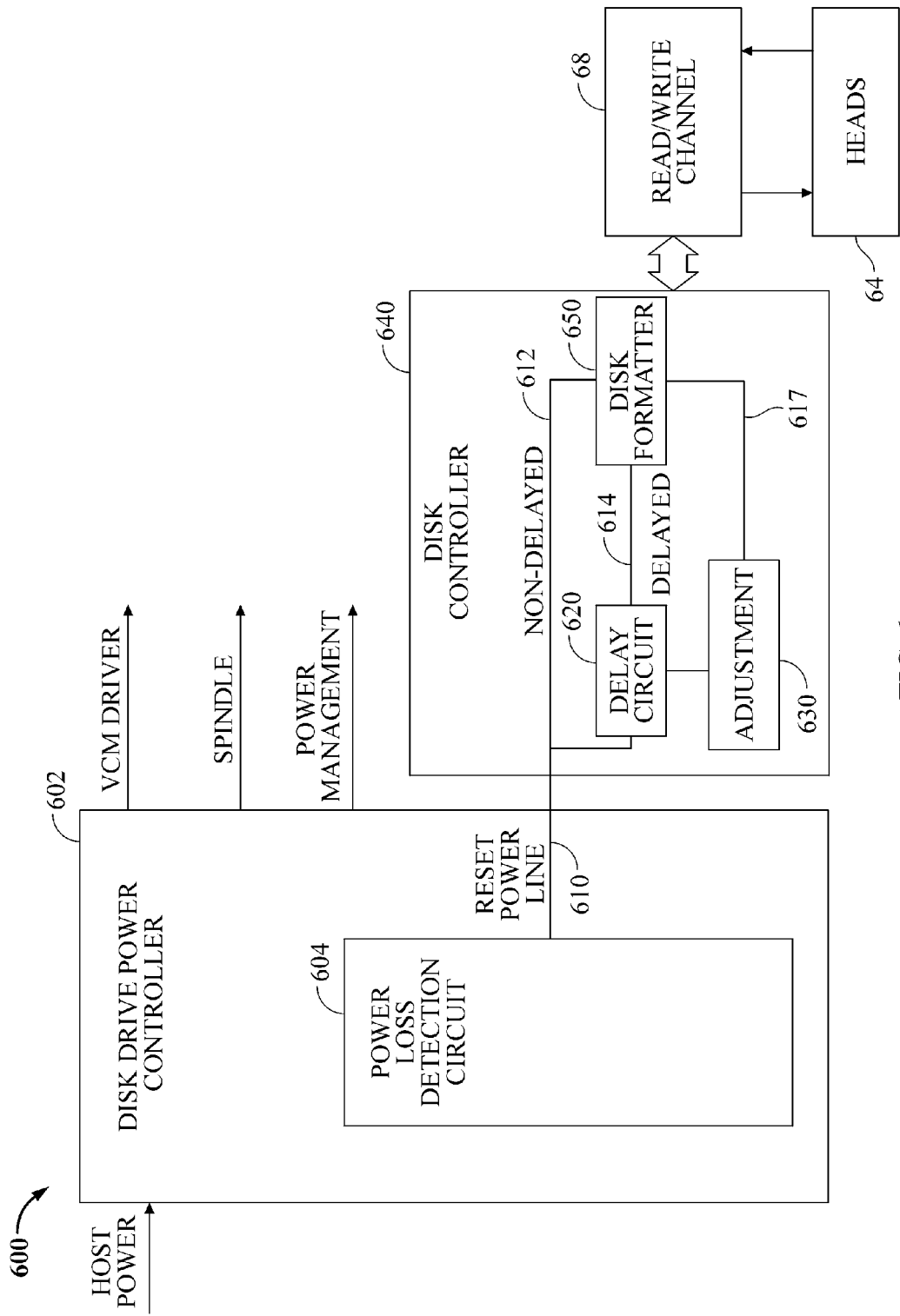
FIG. 6 is a block diagram of reset circuitry to generate both a non-delayed reset signal and a delayed reset signal, according to one embodiment of the invention.

FIG. 6 is a block diagram of reset circuitry 600 to generate both a non-delayed reset signal 612 and a delayed reset signal 614, according to one embodiment of the invention. In this embodiment, disk controller 640 comprises the delay circuit 620. As seen in FIG. 6, power loss detection circuit 604 is included in disk drive power controller 602 and provides reset power line 610 to disk controller 640.

Disk controller 640 receives non-delayed reset signal 612 at both the delay circuit 620 and the disk formatter 650, which are both located within disk controller 640. Further, adjustment circuit 630 is also included in disk controller 640 and is coupled to delay circuit 620 and disk formatter 650.

In this embodiment, both the delayed reset signal 614 and the non-delayed reset signal 612 are received by the disk formatter 650. In particular, disk formatter 650 provides an adjustment value 617 to adjustment circuit 630 based upon the present location of the head in completing a writing of a data sector.

In this embodiment, adjustment circuit 630 provides an adjustment value to delay circuit 620 to control the amount of time before the delayed reset signal 614 is transmitted from delay circuit 620 to disk formatter 650 based upon the present location of the head in the writing of a data sector as determined by the disk formatter 650 itself. Adjustment circuit 630 may, for example, utilize a counter to calculate an adjustment value. Alternatively, the adjustment circuit 630 may comprise a multiplexer connected to a bank of inverters that selectively increases or decreases the number of inverters, which would adjust the delay for the delay circuit 620.

Figure 7:
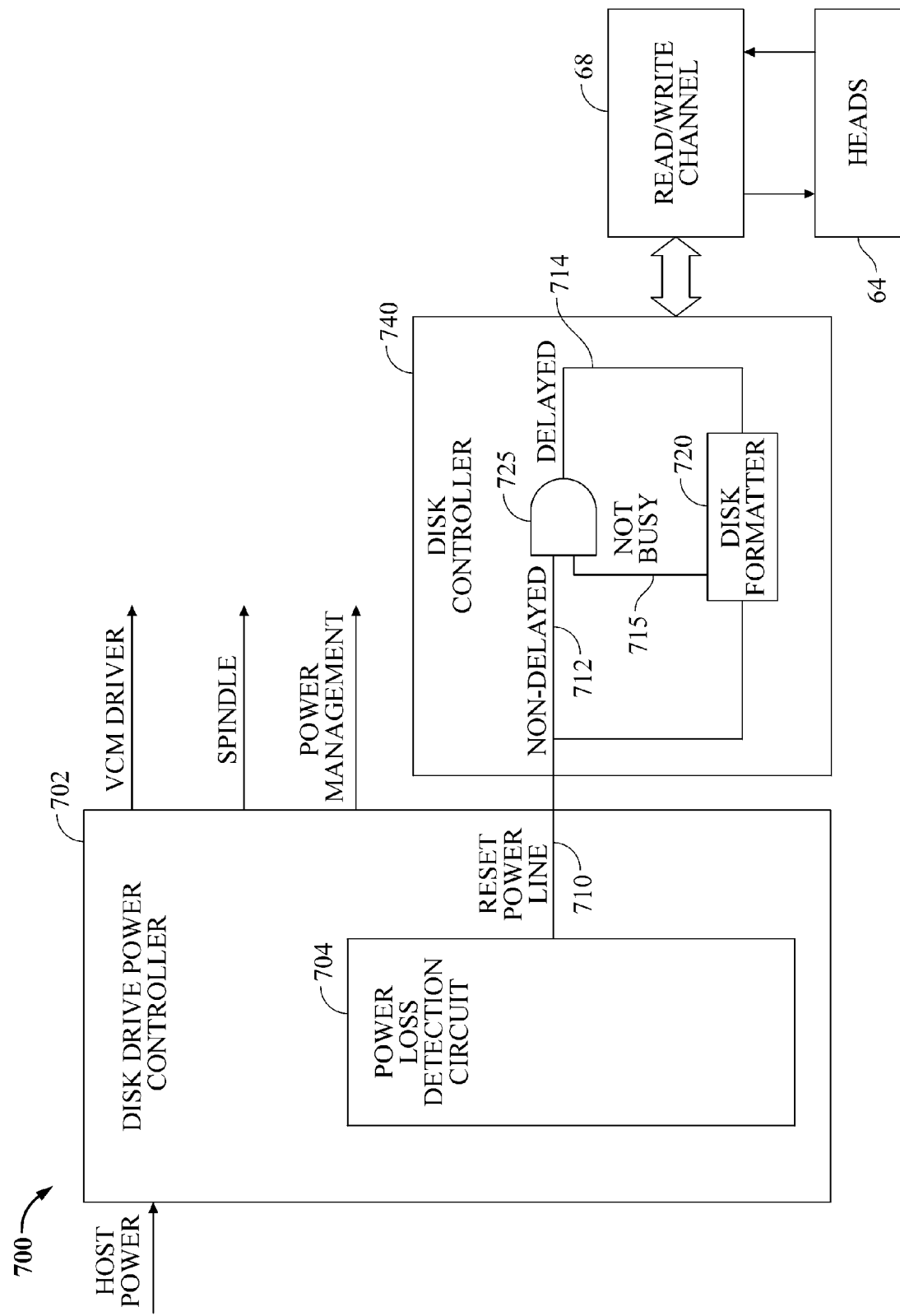
FIG. 7 is a block diagram of reset circuitry to generate both a non-delayed reset signal and a delayed reset signal, according to one embodiment of the invention.

FIG. 7 is a block diagram of reset circuitry 700 to generate both a non-delayed reset signal 712 and a delayed reset signal 714, according to one embodiment of the invention. In this embodiment, the disk controller 740 includes a delay circuit comprising an AND gate 725.

Disk drive power controller 702 includes a power loss detection circuit 704. Power loss detection circuit 704 detects a power loss and generates a reset signal along reset power line 710 in response to a power loss. Reset power line 710 is coupled to power loss detection circuit 704 and to disk controller 740. Reset power line 710 provides a non-delayed reset signal 712 to disk controller 740.

In particular, in this embodiment, the delay circuit comprises an AND gate 725. AND gate 725 receives the non-delayed reset signal 712. Disk formatter 720 also receives the non-delayed reset signal 712. Disk formatter 720 generates a Not Busy signal 715 that is sent to AND gate 725.

In this embodiment, in light of the power loss as identified by the received non-delayed reset signal 712, disk formatter 720 monitors the present location of the head in completing a writing of a data sector and, when the present data sector or data sectors are completely written, disk formatter 720 then transmits the Not Busy signal 715 to AND gate 725. When AND gate 725 receives both the Not Busy signal 715 from disk formatter 720 and the non-delayed reset signal 725, AND gate 725 generates the delayed reset signal 714 which is transmitted to disk formatter 720 to indicate to disk formatter 720 that it is to begin normal controlled shutdown. Alternatively, firmware running on the disk drive may provide an adjustment value based on where the head is located when the reset signal is received.

The methods and processes previously described can be employed for disk drives with embedded servo systems including embedded servo sectors and data sectors. However, numerous alternatives for disk drives or other types of storage devices with similar or other media format characteristics can be employed by those skilled in the art to use the invention with equal advantage to implement these techniques. Further, although embodiments have been described in the context of a disk drive with embedded servo sectors and data sectors, the invention can be employed in many different types of disk drives or other storage devices having a head that scans the media.

We claim:

1. A disk drive comprising:
   a head to perform write and read operations to and from a disk;
   a disk controller coupled to the head to control the write and read operations performed by the head;
   a power loss detection circuit to detect a power loss and to generate a reset signal in response to the power loss;
   a reset power line coupled to the disk controller and the power loss detection circuit to provide a non-delayed reset signal to the disk controller; and
   a delay circuit coupled to the reset power line, wherein the delay circuit delays the reset signal to provide a delayed reset signal.

2. The disk drive of claim 1, wherein the disk controller interprets the non-delayed reset signal as a power loss warning signal.

3. The disk drive of claim 1, wherein the disk controller responsive to the non-delayed reset signal from the reset power line terminates an active write operation performed by the head at a data sector boundary.

4. The disk drive of claim 3, wherein the data sector boundary is a next data sector boundary of the active write operation occurring after the non-delayed reset signal is received.

5. The disk drive of claim 3, wherein terminating the active write operation performed by the head at the data sector boundary avoids a write-splice on the data sector.

6. The disk drive of claim 1, wherein the disk controller enters a reset condition and a controlled shutdown in response to the delayed reset signal.

7. The disk drive of claim 1, wherein the delay circuit is set at a minimum delay value to allow the disk controller to finish an active write operation at a data sector boundary.

8. The disk drive of claim 1, wherein the delay circuit is constrained by a maximum delay value so that the active write operation is terminated before the head is moved for parking due to a controlled shutdown.

9. The disk drive of claim 1, wherein the disk controller comprises the delay circuit.

10. The disk drive of claim 9, wherein the delay circuit includes a gate, the gate to receive the reset signal and a not-busy signal from a disk formatter.

11. The disk drive of claim 1, wherein the disk controller comprises a disk formatter.

12. The disk drive of claim 1, wherein the power loss detection circuit comprises the delay circuit.

13. The disk drive of claim 1, further comprising a disk formatter coupled to the delay circuit and the reset power line, wherein the delayed and non-delayed reset signals are received by the disk formatter.

14. The disk drive of claim 1, further comprising an adjustment circuit to adjust the delay of the delay circuit.

15. The disk drive of claim 14, wherein the disk formatter provides an adjustment value to the adjustment circuit based on the present location of the head in completing a writing of a data sector.

16. The disk drive of claim 1, further comprising a disk drive power controller coupled to the disk controller, wherein the disk drive power controller comprises the power loss detection circuit.

17. The disk drive of claim 1, wherein the delay circuit comprises a delay line.

18. A method to delay a reset signal in a disk drive comprising:
    detecting a power loss;
    generating a reset signal in response to the power loss;
    providing a non-delayed reset signal to a disk controller of the disk drive; and
    delaying the reset signal to provide a delayed reset signal.

19. The method of claim 18, further comprising interpreting the non-delayed reset signal as a power loss warning signal.

20. The method of claim 18, further comprising terminating an active write operation performed by a head at a data sector boundary responsive to the non-delayed reset signal.

21. The method of claim 20, wherein the data sector boundary is a next data sector boundary of an active write operation occurring after the non-delayed reset signal is received.

22. The method of claim 20, wherein terminating the active write operation performed by the head at the data sector boundary avoids a write-splice on the data sector.

23. The method of claim 18, wherein, responsive to the delayed reset signal, the disk controller enters a reset condition and a controlled shutdown.

24. The method of claim 18, further comprising delaying the reset signal to allow the disk controller to finish an active write operation at a data sector boundary.

25. A disk drive comprising:
    a head to perform write and read operations to and from a disk;
    a disk controller coupled to the head to control the write and read operations performed by the head;
    means for detecting a power loss;
    means for generating a reset signal in response to the power loss;
    means for providing a non-delayed reset signal to the disk controller; and
    means for delaying the reset signal to provide a delayed reset signal to the disk controller.

* * * * *